(No Model.)
R. KEELING.
SEPARATOR ATTACHMENT FOR THRASHING MACHINES.
No. 498,123. Patented May 23, 1893.
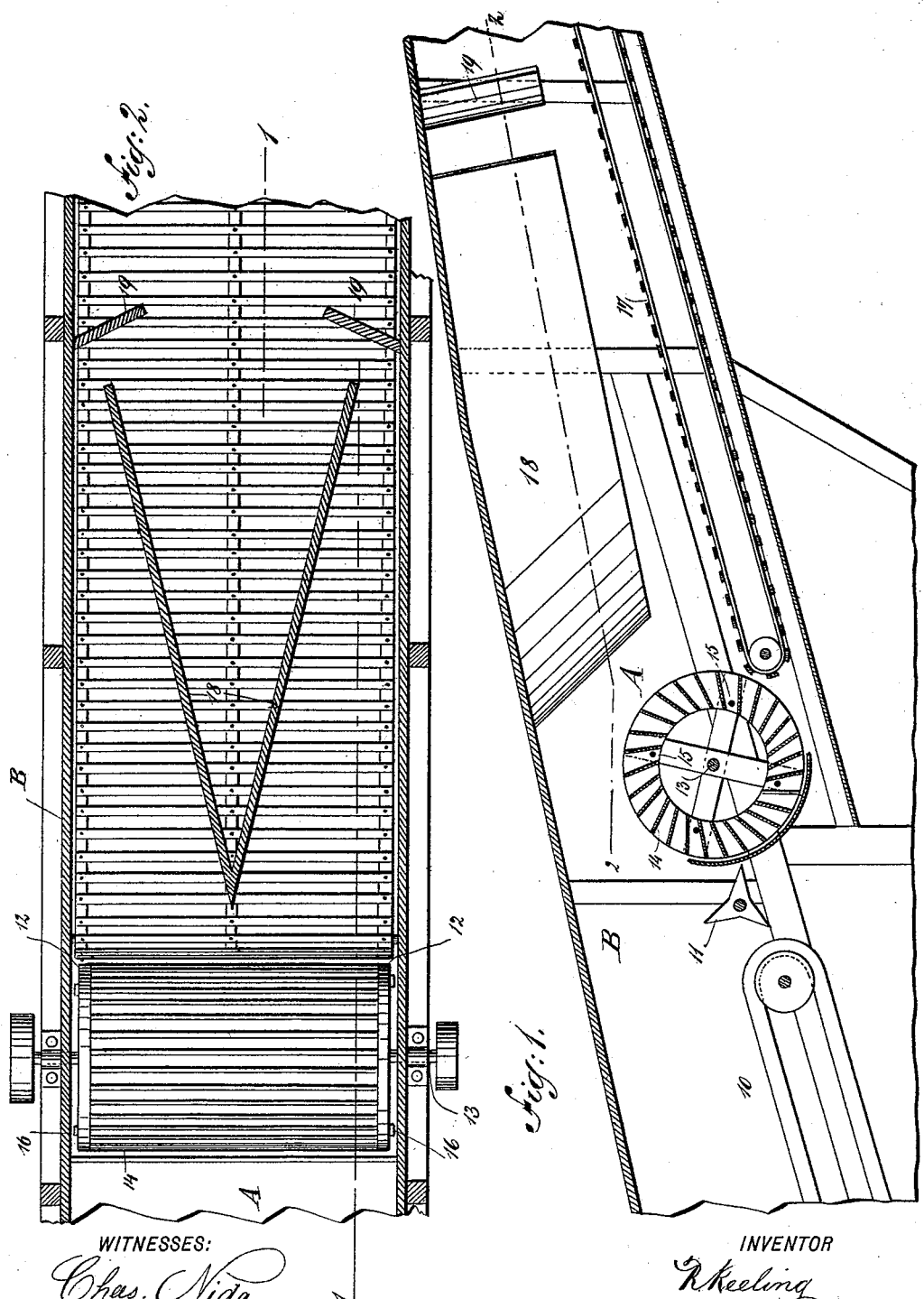

UNITED STATES PATENT OFFICE.

RICHARD KEELING, OF WALHALLA, NORTH DAKOTA.

SEPARATOR ATTACHMENT FOR THRASHING-MACHINES.

SPECIFICATION forming part of Letters Patent No. 498,123, dated May 23, 1893.

Application filed August 1, 1892. Serial No. 441,821. (No model.)

*To all whom it may concern:*

Be it known that I, RICHARD KEELING, of Walhalla, in the county of Pembina and State of North Dakota, have invented a new and improved Separator Attachment for Thrashing-Machines, of which the following is a full, clear, and exact description.

My invention relates to a separator attachment for thrashing machines, and has for its object to provide a device adapted to receive the straw from the thrashing cylinder of the machine, thin out or loosen the straw, and fan the latter in such manner that the chaff will be separated from the straw, thereby permitting the grain to more readily fall down through the straw and rattle rake of the machine.

The invention consists in the novel construction and combination of the several parts, as will be hereinafter fully set forth and pointed out in the claims.

Reference is to be had to the accompanying drawings forming a part of this specification, in which similar letters and figures of reference indicate corresponding parts in both the views.

Figure 1 is a central vertical section through that portion of the thrashing machine in which the device is located, the device being shown partly in side elevation and partly in section, the section being taken practically on the line 1—1 of Fig. 2; and Fig. 2 is a horizontal section taken essentially on the line 2—2 of Fig. 1.

At the rear of the apron or carrier belt 10 which receives the straw from the thrashing cylinder of the machine a picker 11, is journaled, the said picker being practically three-cornered as illustrated in Fig. 1. Immediately back of the picker a combined blower and beater A, is journaled, in the casing B of the machine. This combined blower and beater consists of two end rings or disks 12, which are mounted upon a shaft 13, the shaft 13 being journaled in the casing and provided at an outer end with a drive pulley, through the medium of which the shaft and the beater carried thereby are rotated.

Between the two disks or rings 12 a series of longitudinally arranged plates 14, is located; these plates at their extremities are fitted in suitable grooves produced in the rings or disks, and the entire structure is firmly held together through the medium of rods 15, passed through the disks or rings, and provided at their outer ends with thumb nuts or lock nuts 16, of any approved construction. The plates 14, are arranged diagonally or tangentially upon the disks or rings, standing therefore at acute angles to the shaft 13.

Back of the combined blower and beater a rattle rake 17, is placed, and above the rattle rake at the rear of the combined beater and blower a divide board 18, is secured to the deck of the casing. This divide board is V-shaped and is located at the center of the deck of the casing with its point in direction of the beater or blower; therefore the point of the divide board is opposite the central portion of the beater or blower, as shown in Fig. 2. Back of the divide board two deflecting plates or boards 19, are placed, these boards having a rearward inclination, and they are arranged some distance apart.

In the operation of the device, as the grain passes up the endless belt 10 from the thrashing cylinder the straw is taken up by the picker, and is tossed and thinned out to such an extent that it is delivered in thin layers practically to the blower and beater, and when the straw is engaged with the blower and beater it is thrown upward by the blades thereof, and the current of air created by the revolving of the blower will at the same time blow the chaff from the straw, and as the divide board will separate the current of air created by the blower the chaff will be carried rearward at each side of the divide board through the rear outer end of the machine. By this means the straw when it falls upon the rattle rake is comparatively free from chaff, and the grain will more readily and more copiously separate from it and drop from the rake, Any grains that may be carried along with the chaff will necessarily fall down upon the rake.

This invention is exceedingly simple, it is capable of application to any form of thrashing machine and it is an exceedingly efficient separator, as it not only provides for a quick and ample separation of the grain from the straw, but it does not in any way injure the latter.

The V-shaped divide board 18, is adapted to act as a shield to prevent the waste of grain, and it operates practically in the following manner: As the loose kernels of grain are tossed upward and rearward by the beater blades they strike against the sides of the V-shaped divide board and are deflected to the sides or casing of the machine, and the downward and inward slant of the board directs the grain to the central portion of the rattle rake. The short deflecting boards 19, placed at the end of the space left between the divide board and the casing of the machine, are intended to deflect or turn any flying kernels of grain in direction of the center of the rattle rake, thereby preventing them from passing out at the rear end of the machine. A space is left between the deflecting boards 19, to permit the chaff to pass out of the machine unobstructed, traveling with the current of air produced by means of the fan or beater above the straw.

The beater blades 14 are placed in an inclined position, or diagonally between the heads or rings of the beater for the purpose of tossing the loose kernels of grain and heavy wheat stems, or other material heavier than the straw and chaff, to the top or deck of the machine, as the said heavy material has a tendency to fall between the blades 14 when the machine is running slowly, thereby obstructing the blast of air, as there is a continuous current of air passing in at the ends of the fan or beater and upward between its blades; and the current of air is designed to be at all times sufficiently strong to prevent the straw from winding about the beater.

Having thus described my invention, I claim as new and desire to secure by Letters Patent—

1. In a separating attachment for thrashing machines, a divide board of V-shape arranged in the rear of a separating device, the divide board being attached to the deck of the casing and extending downwardly and inwardly therefrom, as and for the purpose set forth.

2. In a separating attachment for thrashing machines, the combination, with the carrier belt adapted to convey the straw from the thrashing cylinder, of a combined blower and beater held to revolve at the rear of the carrier, and a divide board of V-shape located at the rear of the combined blower and beater, the reduced end of the divide board facing the blower, as and for the purpose set forth.

3. In a separating attachment for thrashing machines, the combination, with a casing and a V-shaped divide board secured to the deck of the casing, of a cylinder journaled in front of the contracted end of the divide board, said cylinder consisting of heads and a series of blades carried by the heads, whereby the cylinder acts as a fan and as a beater, a picker located in front of the fan or beater, and a belt leading from the thrashing cylinder of the machine to the picker, as and for the purpose set forth.

RICHARD KEELING.

Witnesses:
C. MURPHY,
C. N. MURPHY.